Nov. 12, 1935.   W. SCHAAKE   2,020,909
CURRENT COLLECTING APPARATUS
Filed June 30, 1931   3 Sheets-Sheet 1
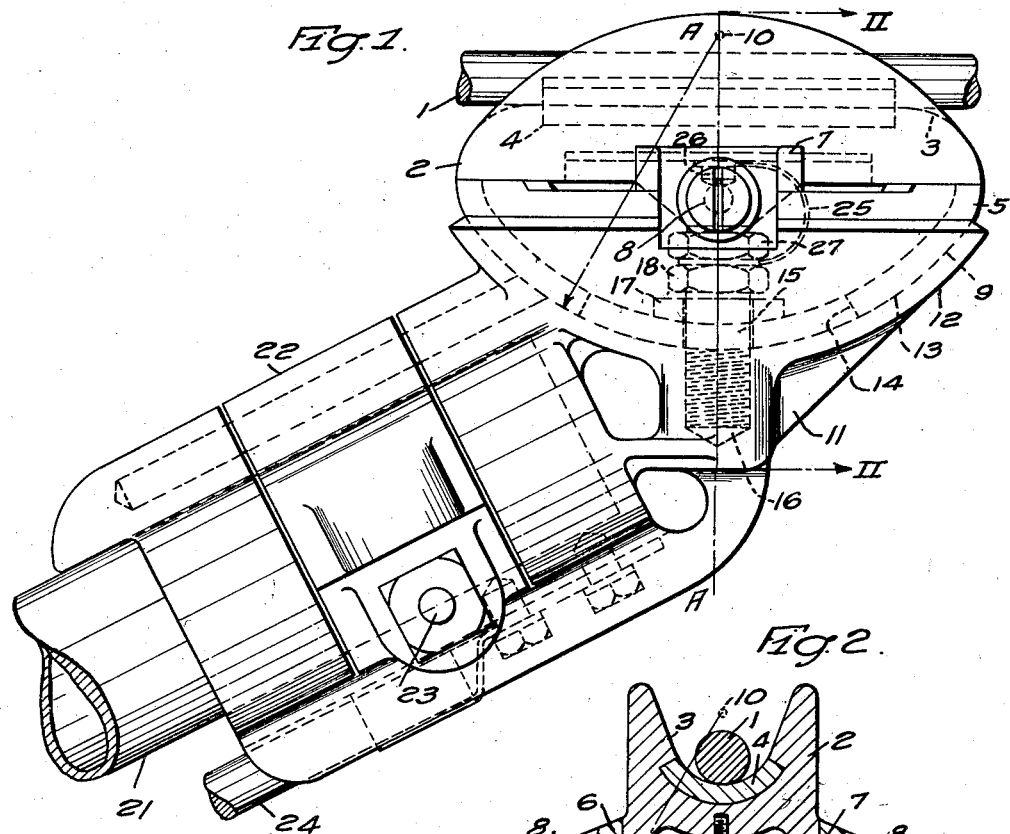
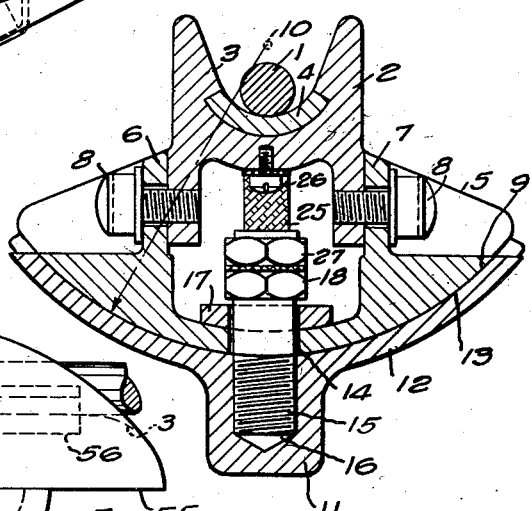
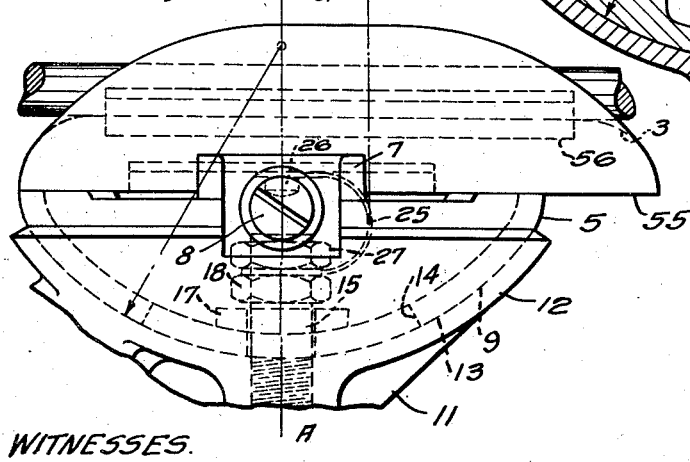
WITNESSES.
E. G. M'Closkey
Robert R Lockwood
INVENTOR
William Schaake
BY
W. R. Coley
ATTORNEY Nov. 12, 1935.   W. SCHAAKE   2,020,909
CURRENT COLLECTING APPARATUS
Filed June 30, 1931   3 Sheets-Sheet 2
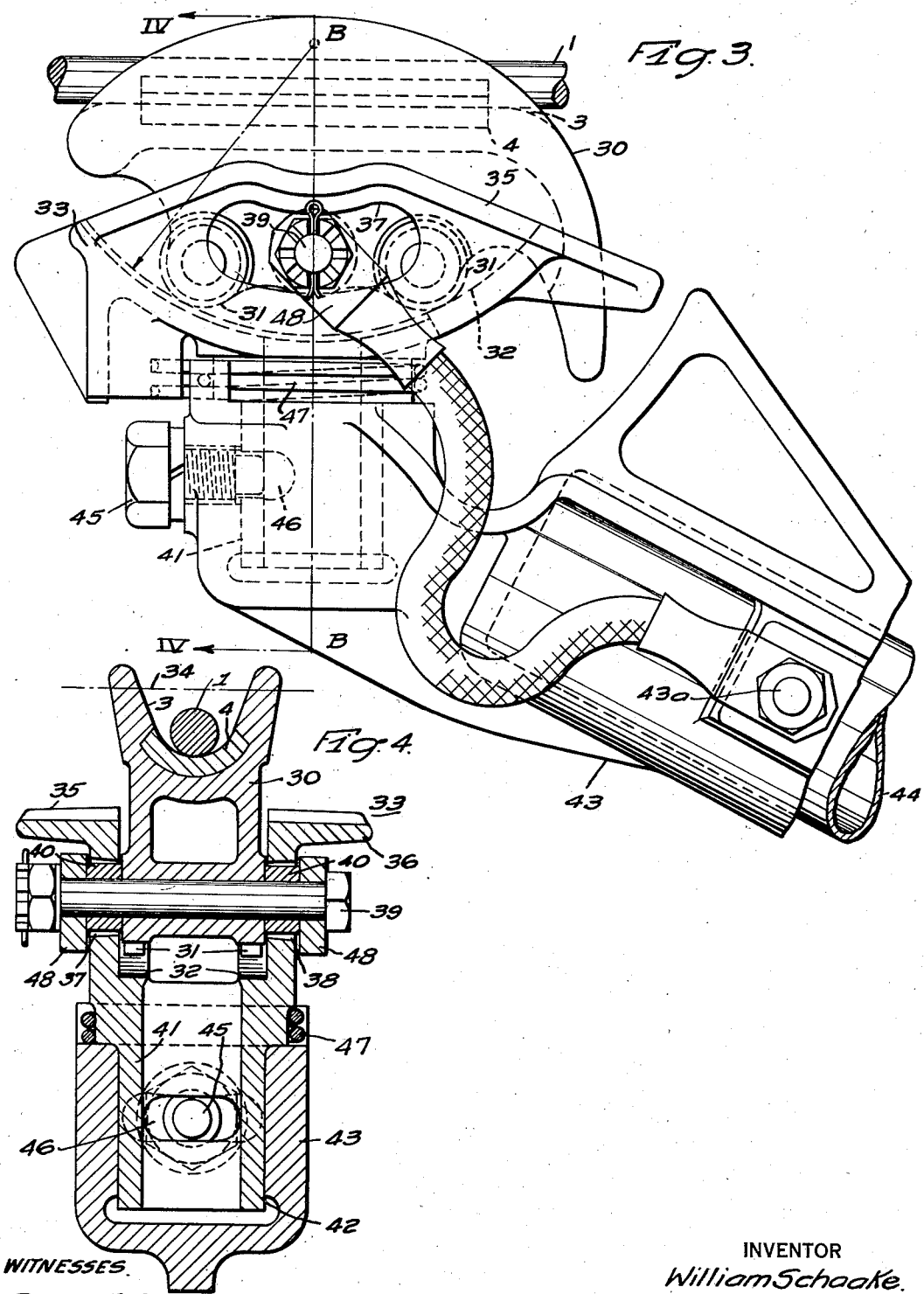

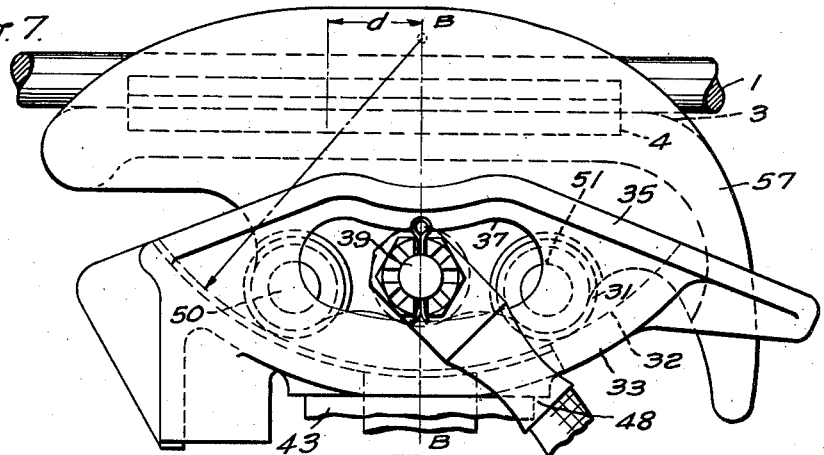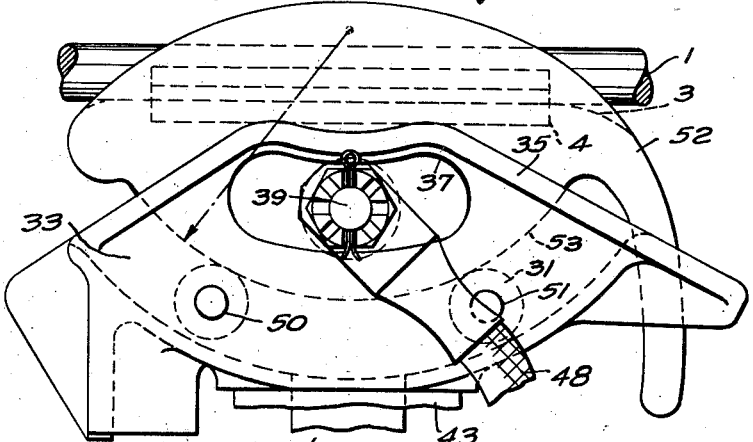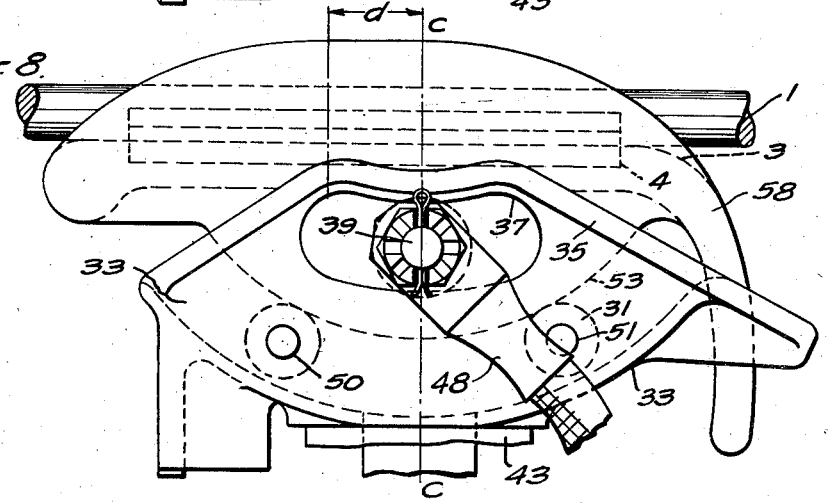

Patented Nov. 12, 1935

2,020,909

UNITED STATES PATENT OFFICE 2,020,909

CURRENT COLLECTING APPARATUS

William Schaake, Pittsburgh, Pa., assignor to Westinghouse Electric & Manufacturing Company, a corporation of Pennsylvania Application June 30, 1931, Serial No. 547,866

4 Claims. (Cl. 191—59.1)

My invention relates, generally, to current collectors for trolley cars and buses, and, more particularly, to current collectors of the sliding-shoe type.

The object of my invention, generally stated, is the provision of a current collector for trolley cars and buses that shall be simple and efficient in operation and be readily and economically manufactured.

A more specific object of my invention is to provide for applying a greater contact pressure between a trolley conductor and the trailing end of a sliding current-collecting shoe than is applied between the conductor and the leading end of the shoe when the shoe is moved along the trolley conductor.

Another object of my invention is to provide for efficiently collecting current from a trolley conductor for propelling an electric vehicle that is disposed to travel along an unsymmetrical path with reference to the trolley conductor.

A further object of my invention is to provide for collecting current from a trolley conductor and transmitting it directly to an electric vehicle without the interposition of sliding contact surfaces, other than the main contacting surface.

Other objects of my invention will, in part, be obvious and, in part, appear hereinafter.

My invention, accordingly, is disclosed in the embodiment hereof shown in the accompanying drawings, and comprises the features of construction, combination of elements and arrangement of parts which will be exemplified in the construction hereinafter set forth, and the scope of the application of which will be indicated in the appended claims.

For a more complete understanding of the nature and objects of my invention, reference may be had to the following detailed description taken in connection with the accompanying drawings, in which:

Figure 1 is a view, in side elevation, of a swiveled current collector constructed in accordance with one modification of my invention;

Fig. 2 is a vertical sectional view, taken along the line II—II of Fig. 1, showing details of construction;

Fig. 3 is a view, in side elevation, of a second modification of my invention showing a slider shoe, with rollers attached, for mounting the slider shoe on a pivoted harp;

Fig. 4 is a vertical sectional view, taken along the line IV—IV of Fig. 3, showing details of construction;

Fig. 5 is a view, in side elevation, of a current collector similar to that shown in Figs. 3 and 4, with the exception that the rollers for supporting the slider shoe are positioned on a pivoted harp;

Fig. 6 is a view, in side elevation, of a current collector similar to that shown in Fig. 1, having the center of the contact surface of the slider shoe displaced longitudinally from the vertical axis of its supporting pole-head;

Fig. 7 is a view, in side elevation, of a current collector similar to that shown in Fig. 3, having the center of the contact surface of the slider shoe displaced longitudinally from the vertical axis of the pole-head; and Fig. 8 is a view, in side elevation, of a current collector similar to that shown in Fig. 5 having the center of the contact surface of the slider shoe displaced longitudinally from the vertical axis of the pole-head.

Referring now to Figs. 1 and 2 of the drawings, the reference character 1 designates, generally, a trolley conductor from which electric current may be drawn to propel an electric vehicle. In order to collect the current from the trolley conductor, a slider shoe 2 is used. The slider shoe is composed of relatively soft material and is provided with a longitudinal groove 3 which is disposed to engage the trolley conductor 1, as shown.

In order to prevent abrasion of the relatively soft slider shoe 2, by the trolley conductor 1, when the shoe is moved along the conductor, an insert 4 of relatively hard material is disposed along the bottom of the groove 3, as shown. The insert 4 may be composed of any suitable material, such as described in Patent No. 1,841,552, filed in my name February 28, 1931, and assigned to the Westinghouse Electric & Manufacturing Company.

In this embodiment of my invention, the slider shoe 2 is supported on a swivel 5, which is provided with a pair of upwardly-extending arms 6 and 7 and is secured thereto by means of suitable screws 8.

With a view to using the slider shoe 2 for collecting current for electric vehicles, such as trackless trolley buses, which do not follow a predetermined path with reference to the overhead trolley conductor 1, the swivel 5 is provided, on its underside, with a spherical bearing surface 9, the center of curvature of which may be located at a point 10 on the conductor side of the contact surface of the shoe 2, near its upper edges and above the conductor 1, for a definite purpose to be hereinafter set forth. As will be readily understood, the conductor side of the contact surface is that side which contains the exposed side of the insert 4 which is in direct contact with the trolley conductor 1, as distinguished from the opposite side of the insert which is embedded in the slider shoe 2.

The swivel 5 is mounted on a pole-head 11, which is provided with a supporting seat 12 having a concave spherical bearing surface 13, for engaging the convex spherical bearing surface 9 of the swivel 5.

In order to limit the movement of the swivel 5 with respect to the pole-head 11, an arcuate slot 14 is provided in the bearing surface of the swivel 5 for engagement with a bolt 15 which is located in a threaded opening 16 in the supporting seat 12. The swivel 5 is limited in its upward movement, relative to the supporting seat 12, by means of a loosely fitting washer 17 and a nut 18 which are associated with the threaded upper end of the bolt 15.

The pole-head 11 may be secured to a trolley pole 21, of any standard construction, by means of a hinged clamp 22 and a bolt 23. The trolley pole 21 is usually constructed of a metal, such as steel, in order to provide the required strength for supporting the pole head 11 and its associated members in operative position. With a trolley pole of this construction the pole head 11 is electrically insulated therefrom by any suitable means and a conductor 24 is secured, as shown, to the pole head to conduct the current to the electric vehicle.

It is readily apparent that the current may be conductor from the trolley conductor 1 through the slider shoe 2, the swivel 5 and the spherical supporting seat 12 to the pole-head 11 and conductor 24. However, such an arrangement may not be satisfactory in some instances because of the likelihood of pitting of the spherical bearing surfaces 9 and 13 which may be caused by arcing as the current passes therebetween. Therefore, a flexible conductor 25 is secured, by means of a screw 26, to the slider shoe 2 and is attached to the bolt 15 by means of a nut 27 located above the nut 18. It will then be noted that a direct electrical connection is made from the slider shoe 2 to the electric vehicle without the interposition of the usual sliding contacts that are necessary when a current collector is used, that is provided with a rotatable trolley wheel.

In the operation of a current collector of the type described in which a slider shoe is used, it has been found desirable to apply a greater contact pressure between the right hand or the trailing end of the insert 4 and the conductor 1, than is applied between the left hand or leading end of the insert 4 and the conductor 1, when the current collector is moved in the direction indicated by the arrow. This distribution of contact pressures serves to improve the tracking characteristics of the slider shoe and to minimize arcing at the trailing end, thereby increasing the speed at which the slider shoe may be moved along the conductor and decreasing the wear caused by arcing between the conductor and the wearing surface of the shoe.

It will be readily understood that the slider shoe 2 and swivel 5 will oscillate about the point 10, when a force is applied along the contact surface of the insert 4. The frictional force, caused by the movement of the slider shoe 2 in engagement with the conductor 1, will produce a moment tending to turn or rotate the slider shoe 2 and the swivel 5 which will be proportional to the product of the frictional force at right angles to the vertical axis A—A and the perpendicular distance between the contact surface of the insert 4 and the center of oscillation 10. It will be readily understood that varying values of contact pressure may be obtained, if desired, by locating the center of oscillation at various distances above the contact surface of the insert 4, or in other words, by varying the radius of curvature of the spherical supporting seat 12.

It will also be noted that the greater contact pressure between the insert 4 and the conductor 1 will still be at the trailing end of the contact surface when the direction of movement of the slider shoe 2 is changed with respect to the conductor 1, as would occur if the direction of movement of the vehicle were reversed without changing the position of the trolley pole. The frictional force will then be in the opposite direction from that above described, thereby tending to turn or rotate the slider shoe 2 and the swivel 5 in the opposite direction about the center of oscillation 10.

Referring now to Figs. 3 and 4 of the drawings, the current collector there shown is more suitable for use with electric vehicles which follow a predetermined path, such as defined by a track. In this modification, a slider shoe 30 is provided having a groove 3 in which is located a metallic insert 4, similar to that described hereinbefore, for engaging the trolley conductor 1.

In order to permit the slider shoe 30 to oscillate in a vertical plane to maintain engagement with a trolley conductor 1 when it is located at varying heights above the track, rollers 31 are provided which are rotatably secured to the under side of the slider shoe 30. The rollers 31 are disposed to engage the arcuate bearing or support surfaces 32 provided on a swivel harp 33. It will be observed that the centers of curvature of the arcuate bearing surfaces 32 are located along the line 34, for a purpose to be hereinafter set forth.

The movement of the slider shoe 30 is maintained within predetermined limits by means of a pair of upwardly extending arms 35 and 36 that are provided with arcuate slots 37 and 38 for engaging a bolt 39 which extends transversely through a suitable opening in the slider shoe 30 and the spacers 40. The slider shoe 30 is thereby permitted to oscillate about the line 34, as an axis, and in a plane perpendicular thereto within the confines of the arcuate slots 37 and 38 while it is being moved along a trolley conductor, which may be located at varying distances above the track.

With a view to providing for following the curves in the trolley conductor, the swivel harp 33 is provided with a downwardly projecting hollow spindle 41. The spindle 41 is pivotally mounted in a cylindrically shaped opening 42 in the pole head 43, which may be secured by any suitable means to a trolley pole 44. A bolt 45 is secured to the pole head 43 and is disposed to engage an arcuate slot 46 provided in the spindle 41 for limiting the rotation of the harp 33 and the slider shoe 30 with respect to the pole head 43. A suitable spring 47 is provided, as shown in the drawings, and is secured at one end to the swivel harp 33 and at the other end to the pole head 43. It will be readily seen that the spring 47 will serve to bias the swivel harp 33 to a central position in alignment with the pole head 43.

It is apparent that the current from the trolley conductor 1 may be conducted through the slider shoe 30 and rollers 31 to the harp 33 and the pole head 43. However, a satisfactory contact engagement between the rollers 31 and the bearing surfaces 32 cannot usually be made without expensive design. Therefore, it is preferable to use flexible conductors 48 which may be secured at one end to the bolt 39, which is in engagement with the slider shoe 30, and connected at the other end to the pole head 43 by bolt 43a.

It will be observed that a greater contact pressure will be obtained between the trailing end of the insert 4 and the conductor 1 than is obtained between the leading end of the insert 4 and the conductor 1, when the slider shoe 30 is moved along the conductor. This desired difference in contact pressure is obtained, as hereinbefore explained, by locating the center of oscillation of the slider shoe 30 above the contact surface of the shoe, for example, above the insert 4 and conductor 1, as along the line 34. The greater contact pressure will always be obtained at the trailing end of the contact surface of the insert 4, regardless of the direction in which the slider shoe 30 is moved relative to the conductor 1.

In some instances, it is preferable to position the rollers 31 on a harp 33, as shown in Fig. 5, rather than on the slider shoe 30 as shown in Figs. 3 and 4. With this arrangement, the same pole head 43 may be used. Suitable shafts 50 and 51 are provided in the harp 33 for carrying the rollers 31. A slider shoe 52 is provided having a groove 3 and an insert 4 located on its surface, as hereinbefore described. On the opposite side, however, an arcuate bearing surface 53 is provided which is disposed to engage the rollers 31 carried by the harp 33.

It will be noted that the center of curvature of the arcuate bearing surface 53 is located on the conductor side of the contact surface of the shoe as described hereinbefore in connection with Figs. 1 and 3, or specifically, above the conductor. The operation of this current collector is essentially the same as described for the current collector shown in Figs. 3 and 4 and will not be repeated.

Under certain conditions, it is desirable to increase the length of the contact surface in engagement with the trolley conductor in order to increase the current collecting capacity of the slider shoe, without modifying the pole head 11 or the swivel 5, as shown in Figs. 1 and 2. In order to accomplish this purpose, a slider shoe 55 may be provided, as shown in Fig. 6, having an insert 56, the center of which is longitudinally displaced a distance "d" from the vertical axis A—A of the seat 12.

As will be readily understood, the current collecting capacity of the slider shoe cannot be increased by increasing the length of the contact surface symmetrically with respect to the center line A—A of the pole head 11 without modifying the design of the pole head and the supporting seat 12. If the leading end of the slider shoe were elongated, the rotation of the slider shoe, when the trolley pole is pushed downwardly by a low trolley conductor, would cause the leading end to engage the forward edge of the supporting seat 12, thereby preventing the contact surface of the slider shoe from maintaining complete engagement with the trolley conductor under these conditions.

In Fig. 7 a current collector is shown which corresponds to that shown in Fig. 3, with the exception that a slider shoe 57 is provided having an elongated contact surface the center of which is longitudinally displaced a distance "d" from the vertical axis B—B of the harp 33. This greater length of contact surface increases the current capacity of the collector without necessitating the modification of the harp 33 or the pole head 43 as described hereinbefore, in connection with Figs. 1, 2, and 6.

Similarly, Fig. 8 shows a current collector corresponding to that shown in Fig. 5 with the exception that a slider shoe 58 having an elongated contact surface, the center of which longitudinally is displaced a distance "d" from the vertical axis C—C of the harp 33, as described hereinbefore in connection with Figs. 1, 2, 6, and 7.

Since certain further changes may be made in the above construction and different embodiments of the invention may be made without departing from the scope thereof, it is intended that all matter contained in the above description or shown in the accompanying drawings shall be interpreted as illustrative and not in a limiting sense.

I claim as my invention:

1. A device for collecting current from a trolley conductor comprising, in combination, a support member and a contact member, said members being provided with engaging spherical bearing surfaces adapted to permit movement in a plurality of planes, said contact member also being provided with a longitudinal groove having a contact surface therein for engaging the trolley conductor, the center of the contact surface being longitudinally displaced from the vertical axis of the spherical bearing surfaces.

2. A device for collecting current from a trolley conductor comprising, in combination, a support member, a contact member, said members being provided with engaging spherical bearing surfaces adapted to permit movement in a plurality of planes, said contact member also being provided with a longitudinal groove having a contact surface therein for engaging the trolley conductor, the center of the contact surface being longitudinally displaced from the vertical axis of the spherical bearing surfaces, and a flexible conductor secured to the contact member and to the support member.

3. A device for collecting current from a trolley conductor comprising, in combination, a pole-head provided with a concave spherical seat having a threaded opening centrally located therein, a swivel positioned on the spherical seat and provided with a convex spherical surface of substantially the same radius as the spherical seat and an arcuate slot centrally located therein, a bolt positioned in the threaded opening in the pole head and extending through the slot in the swivel, a pair of projecting arms carried by the swivel, a slider shoe composed of relatively soft metal and provided with a longitudinal groove secured to the projecting arms carried by the swivel, an insert composed of relatively hard metal positioned along the groove for engaging the trolley conductor and a flexible conductor secured to the slider shoe and to the stud bolt.

4. In a current collecting device, in combination, a swivel having a convex spherical, bearing surface adapted to permit movement in a plurality of planes and a slider shoe carried by the swivel, the slider shoe being provided with a longitudinal groove having an elongated contact surface for engaging a trolley conductor, the center of the contact surface being displaced longitudinally from the vertical axis of the swivel.

WILLIAM SCHAAKE.